(12) United States Patent
Slovetskiy

(10) Patent No.: US 11,063,780 B2
(45) Date of Patent: Jul. 13, 2021

(54) EVENTUALLY CONSISTENT DATA REPLICATION IN QUEUE-BASED MESSAGING SYSTEMS

(71) Applicant: T-Mobile USA, Inc., Bellevue, WA (US)

(72) Inventor: Sergey Slovetskiy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 33 days.

(21) Appl. No.: 16/379,529

(22) Filed: Apr. 9, 2019

(65) Prior Publication Data
US 2020/0059376 A1 Feb. 20, 2020

Related U.S. Application Data

(60) Provisional application No. 62/765,302, filed on Aug. 20, 2018.

(51) Int. Cl.
*H04L 12/18* (2006.01)
*H04L 29/08* (2006.01)

(52) U.S. Cl.
CPC ...... *H04L 12/1877* (2013.01); *H04L 12/1859* (2013.01); *H04L 67/26* (2013.01)

(58) Field of Classification Search
CPC . H04L 12/1877; H04L 12/1859; H04L 67/26; H04L 51/30; H04L 51/14; H04L 67/1095
See application file for complete search history.

(56) References Cited

U.S. PATENT DOCUMENTS

| | | | |
|---|---|---|---|
| 10,365,971 B1 * | 7/2019 | Havemose | G06F 11/1471 |
| 10,621,049 B1 * | 4/2020 | Certain | G06F 11/1471 |
| 2005/0021622 A1 * | 1/2005 | Cullen | H04L 45/00 709/204 |

(Continued)

OTHER PUBLICATIONS

F. Mattern, "Virtual time and global states of distributed systems," Paraliel and Distributed Algorithms, vol. 1, No. 23, pp. 215226, 1989.

(Continued)

*Primary Examiner* — Umar Cheema
*Assistant Examiner* — James Ross Hollister
(74) *Attorney, Agent, or Firm* — Han Santos, PLLC

(57) ABSTRACT

Techniques are disclosed herein for ensuring convergence of states for reliable message delivery in geographically distributed message queuing systems. The techniques include receiving a message at a local system, in which the message is associated with a new message topic. Further, at least one commutative replicated data type (CRDT) object associated with the message is created, wherein the at least one CRDT object corresponds to a unique message identifier (ID). A new message state corresponding to the message ID and the message topic is entered in a message state table, wherein the message state entry indicates a message state corresponding to the message. At least one CRDT object is recorded in a message queue. Thereafter, a list of subscribers including individual subscribers mapped to the new message topic is resolved from a message destinations object. The message is then delivered to at least one of the individual subscribers.

18 Claims, 8 Drawing Sheets

(56) References Cited

U.S. PATENT DOCUMENTS

| | | | | |
|---|---|---|---|---|
| 2005/0262205 | A1* | 11/2005 | Nikolov | G06Q 10/107 709/206 |
| 2013/0304826 | A1* | 11/2013 | Li | H04L 51/14 709/206 |
| 2014/0040206 | A1* | 2/2014 | Ramakrishnan | G06F 11/2097 707/640 |
| 2014/0082085 | A1* | 3/2014 | Krishnaprasad | H04L 51/30 709/204 |
| 2018/0167476 | A1* | 6/2018 | Hoffner | H04L 67/26 |
| 2019/0104179 | A1* | 4/2019 | Falco | H04L 67/26 |
| 2019/0266276 | A1* | 8/2019 | Patel | G06F 16/2379 |
| 2019/0372924 | A1* | 12/2019 | Waltz | G06F 11/3476 |
| 2020/0117680 | A1* | 4/2020 | Bapat | G06F 9/546 |

OTHER PUBLICATIONS

J G. Wang et al., "Building a replicated logging system with Apache Kafka," Proceedings of the VLDB Endowment, vol. 3, No. 12, pp. 16541655, 2015.

M. Shapiro, N. Preguica, C. Baquero, and M. Zawirski, "A comprehensive study of Convergent and Commutative Replicated Data Types," Inria Centre Paris-Rocquencourt; Inria, report, Jan. 2011.

* cited by examiner

EVENTUALLY CONSISTENT DATA REPLICATION IN QUEUE-BASED MESSAGING SYSTEMS

CROSS-REFERENCE TO RELATED PATENT APPLICATIONS

This application claims priority to U.S. Provisional Patent Application No. 62/765,302, filed Aug. 20, 2018, and entitled "Eventually Consistent Data Replication in Queue-Based Messaging Systems," which is hereby incorporated by reference in its entirety.

BACKGROUND

Internet of Things (IoT) applications require massive volumes of streamed data reliably transferred end-to-end from sensor field devices via communications networks and intermediate processing (e.g., fog computing) to the backend (cloud) applications. Message brokers, which are essentially publish/subscribe systems, decouple reliable message reception on the frontend and reliable message delivery on the backend. While message queue handling is assumed to be reliable and consistent when messages are stored or being processed by the message broker, consistent data replication is difficult to realize in practice.

IoT data processing systems mostly use asynchronous messaging protocols with publish/subscribe (pub-sub) model, such as Message Queuing Telemetry Transport (MQTT), Advanced Message Queuing Protocol (AMQP), or newer protocols emulating similar paradigm, e.g., Constrained Application Protocol (CoAP). Those protocols support the Quality of Service (QoS) levels of "At Most Once," "At Least Once," and "Exactly Once" message delivery. Backend systems are typically queue-based systems either using an architecture of message brokering (e.g., MQTT or AMQP) or commit logging (e.g., Kafka). As used herein, the terms "queue" or "queuing system" refers to message brokering and commit logging. Similarly, the terms "message" and "message copy" cover batches of messages that can be processed or transmitted simultaneously. Such systems work relatively well for parallel processing and replication in a local cluster environment but are challenged to support efficient geographically-redundant distributed consistent and resilient data replication. More specifically, existing systems cannot guarantee that messages will not be lost and/or duplicated.

Consistent data replication is a critical requirement for globally redundant distributed systems. Data processing systems for massive streams of data typical for IoT applications are by necessity distributed. Such data processing systems require in many cases, especially for mission-critical applications, that both data loss and duplication are avoided. Telecom-grade systems require geographical separation and redundancy of operations to avoid data loss and service denial in critical or fault situations. The fundamental problem of replication is the requirement to synchronize states of distributed processes and ensure consistency. Consistency can be trivially ensured by using synchronous operations and maintaining a global total order of operations. However, the drawback of this approach is the loss of performance and scalability. Massive distributed real-time stream processing systems required for IoT applications aim for the maximum possible efficiency and cannot compromise on performance.

Existing message brokers, such as RabbitMQ, and ActiveMQ, have been considered as generally adequate for standalone enterprise applications. These applications, however, may lack the ability to process data on a massive scale and be deployed in a geographically-redundant configuration. New solutions, such as Apache Kafka, as well as hybrid solutions having Kafka in-between various messaging standard front and backends (e.g., MQTT or CoAP), are being actively used. However, Kafka cannot ensure an end-to-end consistency for the end-to-end message delivery and the expected model allows for both message loss and duplications.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
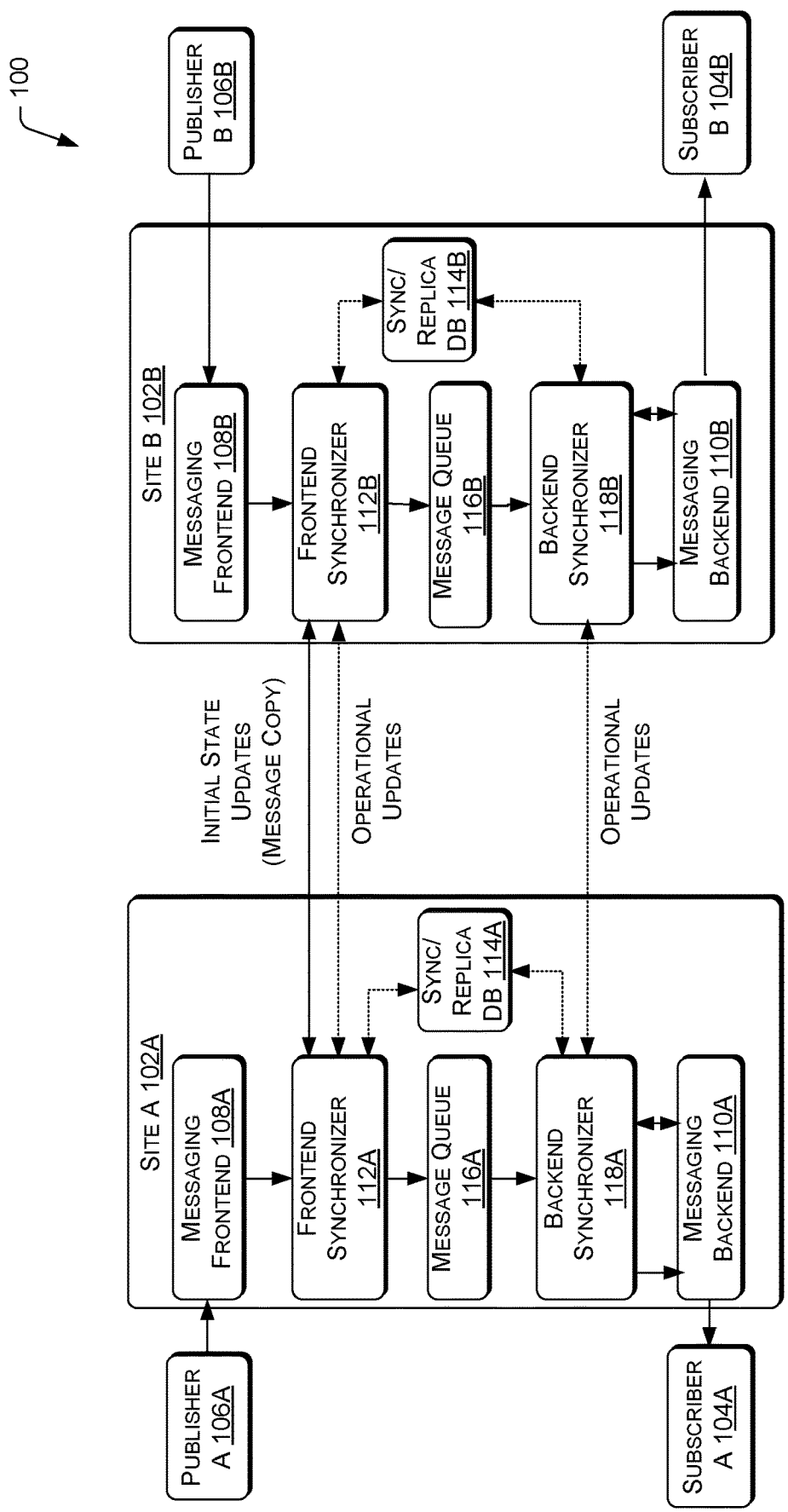
FIG. 1 is a loosely coupled destination and architecture for providing consistent data replication in queue-based messaging systems.

The techniques herein describe providing consistent data replication in queue-based messaging systems that can comprise either active-active or active-passive configurations.
Publish/Subscribe Message Queuing Systems Message queuing systems are widely used for high-performance asynchronous message delivery. Generally, most message queuing systems use the publish/subscribe model, where clients publish messages to a central broker (server) node. A typical message queuing system architecture includes a messaging frontend implementing and terminating a particular messaging protocol (e.g., MQTT). Publisher clients publish messages using a specific protocol to the messaging frontend according to the rules and semantics of the messaging protocol. Each publisher client has a unique client identifier (ClientID) that the messaging frontend uses to ensure the origin, order, and uniqueness of messages. As soon as the message is published, the publisher client does not need to have knowledge of further delivery. Messages are published to separate queues, which implement a First in First Out (FIFO) delivery model. Each message has an associated topic, where the message is to be published, and QoS identifier (e.g., QoS 1, QoS 2) indicating how the message are to be processed by the system. For example, MQTT protocol supports the QoS levels of "At Least Once", "At Most Once", and "Exactly Once" delivery, and messages are published to a particular topic implemented by a broker server node asynchronously.

The messaging frontend then places received messages in the message queue associated with the topic. The message queuing system can be different from the messaging frontend. Some popular implementations are RabbitMQ, Apache ActiveMQ, and Apache Kafka. Consuming clients or subscribers express their interest in messages published by publishers by subscribing to the topic via a messaging backend. Subscribers are other systems that indicate an interest in messages delivered by publisher clients to a particular topic by subscribing to the topic.

As soon as the message is delivered, the broker server system must ensure the message persistence and eventual delivery to interested "subscribers." Subscribers are other systems that indicate an interest in messages delivered by publisher clients to a particular topic by "subscribing" to the topic. Topics are a path-like representation of a messaging queue and consists of a deterministic path. Received messages are placed in the queue associated with the particular message topic. Typically, messages are published to only one topic, such that there is a 1:1 relationship between the message and the topic. Without the loss of generality, the case of publishing to one topic can be considered, as the case of publishing of the same message to multiple topics can be trivially generalized in a similar way as mapping to multiple destinations.

Subscribers, on the other hand, typically can subscribe to several queues by listing several topics in the subscription request. Accordingly, there is a 1:n (one to many) relationship between the message (and related topic) and the destinations (clients subscribing to topics). Subscribers can use an explicit topic or a filtering expression. The syntax of the filter depends on a specific message queuing standard. In the most general example, a filter can be a regular expression. The broker then delivers messages from a particular queue to all active subscribers by sending messages in notifications to subscribers.

The messaging backend and frontend can use different protocols. For instance, the frontend may use MQTT, and the backend may use AMQP, whereas the message queue may implement yet another protocol such as Apache Kafka or have a proprietary implementation.

The protocol specifications for various messaging and publish/subscribe protocols such as MQTT and CoAP do not provide detailed server forwarding and replication guidelines. Instead, these protocol specifications only focusing on the client to server interaction and the consistency of the message delivery from a client to a server. Because the implementation for ensuring the consistency of the messages within the MQTT broker is not defined, it is up to the MQTT broker to provide forwarding and replication implementations. Similarly, even though Kafka provides basic replication functionality, it lacks clearly defined geo-replication architecture providing guarantees of the message delivery without loss and duplication.

By decoupling publishing and subscribing, scalability, performance, and reliability can be achieved. However, the challenge remains in ensuring that the broker server implementation can process and replicate messages across geographically distributed sites according to the queuing semantics and, at the same time provide guarantees of "At Least Once" and "Exactly Once" delivery.

Eventually consistent asynchronous and performant system ensures reliable delivery of massive amounts of messages via geographically redundant distributed message queuing system using asynchronous replication and updates of specific Convergent and Commutative Replicated Data Types (CRDT) preserving the semantics of common IoT messaging protocols. The solution allows to guarantee the delivery semantics of QoS 1—"At Least Once" and QoS 2—"Exactly Once" in a distributed geo-redundant IoT messaging queue-based system, therefore solving the problem of geo-redundant message queue replication that is currently lacking.

To ensure strong eventual consistency of the replicated data, the techniques include implementing non-blocking asynchronous protocols, procedures, and data structures to achieve robust, decoupled eventually consistent geo-redundant replication of streaming messaging data. More specifically, implementation of the solution involves: defining the architecture of the replication system; defining the exact data structures and a combination of strongly consistent CRDTs that could be mapped to and accommodate a variety of messaging protocols; and defining a lightweight asynchronous synchronization and update protocol. The architectures can accommodate solutions where messaging front- and backends implement different messaging protocols, whereas a message queuing system in between uses a different technology. The techniques as described herein are used to address the data replication, synchronization, and consistency problem for a geo-redundant configuration used by an IoT service enablement platform. Both active-passive and active-active failover scenarios are supported.

Virtual (Logical) Time and Clocks

Geo-distributed system is an asynchronous distributed system consisting of multiple processes without common memory communicating via messages. To avoid any delays, blocked states, or race conditions, the objective is to use as much asynchronicity as possible. In the distributed system it is impossible to perfectly synchronize physical clocks and keep common time. Therefore, virtual (or logical) time is used to keep account of the deterministic sequence of events. The clock tracks message evolution within its lifecycle in the system, i.e., from the initial message received from the publisher to the state when the message has been successfully (acknowledged) delivered to all subscribers and is removed from the queue. Additionally, or alternatively, the message can be considered as processed in, for example, commit log systems without removal from the log.

In various embodiments, a Lamport clock may be used. Lamport clock is the simplest system implementing virtual time, and consists of a set of incrementing integers N as the time domain T. The logical clock is implemented as a system of counters $C_i$ per process $P_i$ with the following logic applied. For instance, the initial value of the Lamport clock is $C_i=0$. When the initial message is received, the reception event starts the logical clock tracking the message lifecycle in the distributed system: $C_1=1$. Thereafter, the clock is increased every time an internal event happens, and when the synchronization state is updated: $C_i:=C_i+d$, (d>0, e.g., d=1). It is not necessary to increment the clock on send event, but rather increment the clock on the event of the replica state update. In this way, the Lamport clock allows to conclude that if $C(e)<C(e')$ then it is guaranteed that the event e' cannot happen before the event e, such that e≤e'. Thus, this implementation enables a user to determine which replica of two is the most recent.

The concept of vector time and vector clocks extends the concept of the logical time (e.g., Lamport clock). A distributed system may have N processes $P_i$, where i∈[1 . . . N], and each process has a simple Lamport clock $C_i$, which is incremented by 1 each time an event happens. Vector time stores the knowledge of the local time $C_i$ at each process $P_i$ in a vector data structure VC:=[1 . . . N] with N integer vector components, where an i-th component is mapped to the Process $P_i$. With each local event, the related component of a vector VC increments: $VC_i(i)$: $=VC_i(i)+1$. Each message sent between processes carries the latest vector of the local clock. The receiving process combines its own clock with the sender process vector timestamp received in the incoming message: $C_i:=\max(C_i, t)$, where t is the vector clock timestamp of the message and max is component-wise maximum operation.

At any instant of real time, where i is the index of the local process $P_i$, the following holds: $\forall i, j: C_i[i] \geq C_j[i]$. This means that the local process always has the highest timestamp. The rules of comparison of vector clocks are defined as follows: For two-time vectors u and v:

$u \leq v$ if $\forall i: u[i] \leq v[i]$;

$u < v$ if $fu \leq v$ AND $u = v$; and $u \| v$ if $f$ NOT($u \leq v$) AND NOT($v \leq u$);

where ≤ and < are partial orders, and H indicates concurrent processes.

The vector timestamps can be used to evaluate the state of synchronization between distributed processes. Given that a message evolution process has to go through a set of determined states, synchronized state means that vector clocks on both sides are equal, and the process, which vector clock is less than the vector clock at another process is at an earlier state in the evolution. This allows to define a condition on the eventual consistency of replicated states at several distributed systems.

Convergent and Commutative Replicated Data Types

Replication is critical to maintain globally redundant distributed systems and ensure correctness of distributed operations. The fundamental problem of replication is the requirement to synchronize states of distributed processes and ensure consistency. Consistency can be trivially ensured by using synchronous operations and maintaining a global total order of operations. However, the drawback of this approach is the loss of performance and scalability.

Massive distributed real-time stream processing systems required for IoT applications aim for the maximum possible efficiency and cannot compromise on performance. Non-blocking asynchronous protocols and loosely coupled components are used. To ensure consistency of states and operations in distributed systems using asynchronous messaging between processes without compromising on reliability or performance, CRDTs are used. CRDTs combine specific data payloads with update rules based on simple mathematical properties. By design, CRDTs provably converge to a common state after a limited number of updates. Depending on the design, CRDTs may converge even if updates are delivered out of order and only require an available communication channel between processes. A communication channel may be unavailable some of the time with updates lost as soon as repeated updates still reach the downstream system. Updates may be delivered asynchronously and consensus or centralized synchronization of states is not required. The main condition ensuring convergence of CRDTs is commutativity, which means that different order of operations leads to the same eventual state. For example, for payloads A and B and eventual state C: A+B=B+A=C. In another example, for operations f and g on payload A: f(g(A))=g(f(A))=C.

A combination of a specific CRDT data structure implements a simplified asynchronous replication protocol combining state- and operation-based object replication. In various embodiments, the following CRDTs are used: messagePayload CRDT, message event and state or messageEventState CRDT, and messageDestination CRDT. The messagePayload CRDT contains the original message body and all message metadata including publishing clientID, reception local timestamp, an initial state of the vector clock, and/or so forth. The messageEventState CRDT contains the state of the message evolution mapped to particular events related to state changes and message processing (received, stored, delivered, etc.). The messageDestinations CRDT contains a list of message destinations including clientIDs of known subscribers, and related subscription topic filters.

Loosely Coupled Destination and Architecture

Having introduced publish/subscribe message queuing, virtual time and clocks, and CRDTs, example embodiments of the system architecture are described herein with respect to the figures. FIG. 1 shows a loosely coupled model 100 of a message queuing system architecture comprising a two-site configuration, wherein site A 102A can comprise a source system and site B 102B can comprise a downstream system. The techniques described herein are equally applicable to both active-passive and active-active systems. Each site 102A, 102B can include a computing device or a node comprising a messaging frontend 108A, 108B implementing and terminating a particular messaging protocol (e.g., MQTT). Publisher clients 106A, 106B publish messages using a specific protocol to the messaging frontend 108A, 108B according to the rules and semantics of the messaging protocol. Each publishing client 106A, 106B has a unique client identifier (clientID) that the messaging frontend 108A, 108B uses to ensure the origin, order, and uniqueness of messages. Each message has an associated topic, where the message is to be published, and Quality of Service (QoS) identifier or level indicating how the message is to be processed by the system. For example, in MQTT, the QoS 1—"At Least Once" means that the message must not be lost, but duplicates may be delivered to the backend (subscriber) system. In contrast, in MQTT, the QoS 2—"Exactly Once" means that the messages must not be lost and duplicates are not allowed.

Messaging frontend 108A, 108B then places received messages in the message queue associated with the topic. Message queuing system can be different from the messaging frontend 108A, 108B. Some popular implementations are RabbitMQ, Apache ActiveMQ, and Apache Kafka. Consuming clients or subscribers 104A, 104B express their interest in messages published by publishers 106A, 106B by subscribing to the topic via messaging backend 110A, 110B. Messaging backend 110A, 110B and frontend 108A, 108B can use different protocols. For example, the frontend 108A, 108B may use MQTT, and the backend 110A, 110B may use AMQP, whereas the message queue may implement yet another protocol such as Apache Kafka or have a proprietary implementation using a database.

In the loosely coupled destination model, it is assumed that the messaging frontend 108A, 108B, and the messaging backend 110A, 110B are separated by opaque message queue 116A, 116B. Accordingly, the receiving (publication) messaging frontend 108A, 108B has no knowledge about the subscription state of the sending (subscription) backend 110A, 110B. This is possible in a highly distributed and compartmentalized architectures. In the illustrated embodiment, two synchronizer layers 112A, 112B, 118A, 118B are split for the frontend and backend processing. Each synchronizer 112A, 112B, 118A, 118B implements an update protocol independent endpoint. In various embodiments, upon receiving a message, the frontend synchronizer 112A, 112B creates CRDTs. Further, upon message reception, a unique immutable messagePayload CRDT object is created uniquely identifying the message and payload in the distributed system. The following information is recorded:

| Field | Description |
| --- | --- |
| Arrival Timestamp | Physical timestamp upon the reception of a message by the receiving node (e.g., 2018-05-07T15:30:15:12345) |
| vClock Initial Value | Starting value of the associated vector clock (e.g., [1,0] for Site A) |
| SenderID | The unique ID of the Publisher client, for MQTT it is derived from the clientID reported during the initial connection and is derived from the appropriate state |
| ReceiverID | The unique ID of the receiving server, which is the remote messaging system where the queue is being replicated. This is not defined in the MQTT standard. Each replicating site as a unique serverID |
| PublicationID | Unique packet or session ID specific per client messaging protocol, e.g., for MQTT this would be derived from the packetID field of the incoming MQTT publish message. This ID must be unique to the specific message publication cycle, i.e., from the initial message to the successful acknowledgment |
| Topic | The topic value derived from the publish message could be specific per messaging protocol |
| Message | Full Received Message including payload and metadata fields |

A messagePayload CRDT object is created by appending all of the above records together, calculating the unique hash of the resulting data, which is assigned as the globally unique messageID and appending the hash as the unique messageID to the front of the structure. The messageID can also serve as a logical (message processing) process identifier. The hash does not have to be cryptographic and can be optimized for performance, for example, according to the MurmurHash, FNV1a, or Siphash algorithm.

The initial messageEventState CRDT object is created by setting the initial state event and appending the initial value of the vector clock (e.g., [1,0] for the two-site configuration). The messageEventState CRDT object is a partially ordered set of message state evolution. The condition is that the evolution progresses linearly (incrementally) and cannot decrement. One example implementation includes the following states (e.g., enum): 0 or null (payload not yet received); 1 or received (replica created); 2 or stored (receipt acknowledged, message accepted for reliable delivery); 3 or partially delivered (to some of the recipients or subscribers); 4 or delivered (fully delivered to all recipients); and 5 or finished (removed from queue and/or archived, e.g., conditional on the synchronized vector clock). The system actions can be based at least partially on the message state.

The initial messageDestinations CRDT object (updateable set of message recipients with add or remove operations) is created by resolving subscribers 104A, 104B to the topic associated with the message, placing them as a list in the messageDestinations CRDT object, and appending the initial value of the logical (e.g., Lamport or vector) clock.

Updates carry a CRDT payload in atomic messages asynchronously and in a non-blocking manner so that there is no state to block further message processing. As soon as the frontend synchronizer 112A, 112B has created a CRDT, the initial messagePayload and messageEventState CRDT object updates are sent to site B 102B. In various embodiments, each update may receive an acknowledgment (ACK) from site B 102B. ACKs carry the updated state information and are asynchronous, and at any time can be substituted by a related update from site B 102B. If the frontend synchronizer 112A, 112B receives an acknowledgment from site B 102B, the frontend synchronizer 112A, 112B updates the related record in a sync/replica state database 114A, 114B, wherein the sync/replica state database 114A, 114B can be implemented as any appropriate data structure.

The frontend synchronizer 112A, 112B puts messagePayload CRDT in the message queue 116A, 116B in its entirety guaranteeing that each message is uniquely associated with the messageID. While messagePayload is in the message queue 116A, 116B, the backend synchronizer 118A, 118B reads the message topic from the messageState table and resolves current active destinations or subscribers 104A, 104B mapped to the message topic. When a messagePayload CRDT reaches the messaging backend 110A, 110B, it is delivered to all available subscribers 104A, 104B. If, while the message has been in the queue 116A, 116B, the list of subscribers 104A, 104B changes, then the frontend synchronizer 112A, 112B only delivers to the currently available subscribers 104A, 104B, and the message remains in the message queue 116A, 116B.

When the message is partially delivered, backend synchronizer 118A, 118B updates local CRDT objects, sends updates downstream to site B 102B, updates state in the messageState table, and records the messagePayload CRDT address in the message queue 116A, 116B. As soon as missing subscribers re-subscribe, the frontend synchronizer 112A, 112B releases delivery to remaining subscribers 104A, 104B. As soon as the message has been delivered to all subscribers 104A, 104B and the message states have been synchronized between site A 102A and site B 102B, the backend synchronizer 118A, 118B removes the message from the message queue 116A, 116B or archives the message. Additionally, or alternatively, the message state can be marked as finished and stored in a commit log until it is expired according to the applicable messaging system policy. Thereafter, the message processing is complete for the particular messageID.

Synchronization state as indicated by the frontend synchronizer 112A, 112B is reflected and kept locally in the sync/replica state database 114A, 114B. The sync/replica state database 114A, 114B can comprise a messageState table, which is an entity that can indicate whether a particular messageID is in active processing in the system and keep the general state of the message as well as globally synchronized vector time. The messageState table can be implemented as a database, hash table, hash tree, struct type, class or object. The messageState table implements a data structure and related methods to manipulate the data. If implemented as a hash tree (prefix tree) or similar indexing algorithm for a database implementation, the cost of a messageID hash lookup will be O (1), where I is the length of the messageID hash. The messageState table is maintained at each local system comprising the hash table with messageID (hash) as a unique (per system) index, an indicator of the state, and additional data. The messageID in the messageState table maps to the CRDTs jointly, thereby completely describing and defining the state of the particular message processing. The messageState table reflects changes in response to an internal event or an update changing the state of any of the existing CRDTs.

An example embodiment of the messageState table is shown below.

| Field | Description |
| --- | --- |
| messageID | The unique ID of a message |
| State Flag | Null [empty], Added [1], Removed [0] |
| Vector Clock | Starting value of the associated vector clock |
| Last Operation Timestamp | Physical timestamp upon the reception of a message by the receiving node |
| Queue Pointer | Set (topic, partition, offset) |

The state flag field characterizes the global observed state of the message. The least significant bit in the state flag parameter indicates whether the particular message payload has been received by the system and is in the added set A or removed set R. More specifically, the state flag indicates whether the message has been observed elsewhere (out of order update delivery) to record the fact of the global existence of the message. The state flag also indicates whether the local system has received the payload. After the payload has been received, the message is considered as locally active (added to the active set). The state flag also indicates whether the message has been removed from the local active set. Finally, the state flag indicates whether the global processing of the message has been finished and the message can be removed from the message queue and/or archived.

In various embodiments, the state flag comprises two bits. The most significant bit (MSB) indicates "1" if the messageID has been observed at least once, and "0" when it has been removed. This is needed to account for the out of order delivery when any of the update messages arrive before the payload message to site B 102B. In this case, site B 102B has a preview of the message. In this way, the messageID is known to exist, but the payload has not yet arrived. The least significant bit (LSB) indicates whether the payload has been received and added to the local system if "1" and if it has been removed if "0."

Thus, the state flag indicator has the following bit values: Ø—null or undefined: the message with messageID has not been observed by the local system; bin 10=int 2: the message with messageID has been observed, but the payload has not yet been received (out of order delivery) or the lifecycle has been finished, the message has been fully processed and removed from the system; bin 11=int 3: the message with messageID has been observed and the payload has been received; bin 01=int 1: the message with messageID and payload has been received without previous out of order delivery; bin 00=int 0: the message has been removed from the active state.

Another field implements a pointer to the queuing system representing the message's place in the message queue 116A, 116B. The pointer to local queue field has the following semantics. The pointer to local queue field is empty when no messages have been inserted in the local message queue 116A. Conversely, when the point to local queue field is not empty, it indicates the message is in the local message queue 116A. Details of the pointer record, when combined with the value in the messageEventState CRDT object, uniquely identifies the state of the message in the message queue 116A, 116B. Depending on the message queuing system used, the values may be different, and may not allow retrieving the message from the message queue 116A, 116B on demand.

The messageState table also maintains the current virtual clock observed by the local system, which is updated during each local event and/or update. Without limitations, other fields in the messageState table include metadata, such as timestamp, and/or so forth. The messagePayload CRDT object is an immutable object and allows to synchronize and record the original message in its entirety. The messageEventState CRDT object reflects the evolution of the global message processing. The messageDestinations CRDT object reflects a set of destinations during the lifecycle of the message. Global message evolution is complete when the current messageDestination set is empty and the vector clock is synchronized for all processes, ensuring that all updates have been delivered and all systems agree on the global state being finished.

The messagePayload CRDT object implements a state-based set CRDT to synchronize the original message payload between sites A 102A and B 102B. It contains the original message metadata and payload together with the messageID calculated as the hash of the payload. Thus, a message object is uniquely identified by the messageID.

In a system-wide context, the messagePayload CRDT object may implement different CRDTs based on the semantics of related message delivery QoS corresponding to a QoS identifier. For the "At Least Once" delivery (e.g., MQTT QoS 1), which means that the delivery must be guaranteed, but duplications are possible, the message replica object may follow the Observed Remove Set (OR-Set) CRDT object, where the additions may be added concurrently and without limitations, but the removal may occur only if the element has been observed in the set. For the "Exactly Once" delivery (e.g., MQTT QoS 2), which means that the delivery must be guaranteed and there may not be any duplicates, the 2P-Set (2-Phase Set) must be implemented.

The message replica object implements the following algorithm: When the message is received by one of the systems, it creates the payload state object uniquely identified by the messageID. The initial synchronization update comprises the payload state object including the message body itself. All the objects are appended into an initial state replica update, which is the CRDT and its replicas have been proven to converge and meet the conditions of eventual consistency. Initial downstream update operations are performed, which comprises the steps of sending the initial state replica object to site B 102B. The replica object is formed from simpler objects, which are CRDTs, and therefore, is itself the CRDT.

When the initial replica of the initial messagePayload CRDT object is received by site B 102B, it is considered as "received," and is put in a buffer until the messageState changes to "stored." The messageState record is created if it does not exist or is updated with the topic and appropriate information if it exists in the "observed" state. When the messageEventState CRDT object is received with the "stored" state, the message is put into the queuing system, at which point the messageState table record is updated to reflect the updated topic information in the pointer to local queue field. At this point, the messagePayload CRDT object may be removed from the buffer to save state and its metadata may be either retained or removed.

Subsequent synchronizations are performed atomically by sending downstream updates comprising either messageEventState replica object, messageDestinations replica object, or a combination thereof.

Updates are applied atomically to the destination replica according to the rules described in the object specification. Updates to event objects are incremental and follow the totally ordered sequence of event states. Site B 102B implements a system-wide 2P-Set CRDT, where only unique new messages (identified by its messageID) can be added. This follows the add-once-remove-once semantics and allows to avoid multiple synchronizations of the same message replicas.

When the message is completely processed, the messageState table is updated to reflect that is it now moved to the removed set (set R). One example of the implementation described earlier is the messageState table where the messageID is added only once, and the sets are emulated as follows: added set (set A) is identified by the state flag field having the least significant bit set to "1," and the removed set is identified by the least significant bit set to "0." Accordingly, each site synchronizer 112A, 112B, 118A, 118B maintains two sets of messageIDs to track messages in the message queue 116A, 116B (set A) and messages that have been processed and removed from the message queue 116A, 116B (set R).

The messageDestinations CRDT object in the loosely coupled model 100 forms a separate process mapped to a particular publishing topic, whereas in the tightly coupled model as described below in FIG. 2, it is a subset of the message replica object with separate update rules. The messageDestinations CRDT object includes the payload, which contains a set of subscribers 104A, 104B to the topic with related information. In general, the payload will have the form of the variable length list, where each element contains the record including a subscriberID corresponding to a subscriber 104A, 104B, and list of QoS:topicFilter pairs. It is up to the messaging system to decide how the topicFilter resolution to a particular message topic is handled. It is possible that the resolution semantics will require to deliver a message once per each topicFilter. However, to preserve the QoS 2 "Exactly Once Delivery," the resolution must be explicit and the set will contain only one (QoS, topicFilter) tuple per subscriberID. If the topic is created upon reception of the first publishing message, then the object is created at that time.

In the general case, the messageDestinations CRDT object is maintained per topic and is separate from particular messages. When a message is received or stored, the snapshot of the messageDestinations CRDT object is appended to the message. The messageDestinations CRDT object also follows the 2P-Set semantics, wherein for the lifecycle of the message, only unique new subscribers 104A, 104B can be added; once removed, the same subscriber 104A, 104B cannot be added; once all subscribers 104A, 104B are removed from the active set (i.e., the message has been delivered to all subscribers 104A, 104B that indicated interest in this message during the message lifecycle), the message object can be removed from the message queue 116A, 116B.

The messageEventState CRDT object represents the state evolution of the message processing from the message publication to the message removal from queue 116A, 116B and possible archival. The messageEventState CRDT object is modeled as an incremental counter state 2P-Set CRDT, where the counter state is evolving from the minimum to the maximum enumerated state as follows: 0 or undefined; 0 or null; 1 or received; 2 or stored; 3 or partially delivered; 4 or delivered; 5 or finished. This object defines merge operation when the merge calculates the least upper bound of the local copy and the received update, i.e., maximum of the state.

The system actions are defined on the change in the state after update as follows: 0 or null: if a message is not received, the frontend synchronizer 112A, 112B puts a placeholder in the messageState table for possible out of order delivery states; 1 or received: the frontend synchronizer 112A, 112B creates the object, and adds the object to an index or keep the object in cache; 2 or stored: the frontend synchronizer 112A, 112B stores the object in the message queue; 3 or partially delivered: the backend synchronizer 118A, 118B updates the messageDestinations CRDT object; 4 or delivered: the backend synchronizer 118A, 118B updates the messageDestinations CRDT object; 5 or finished: the message queue 116A, 116B removes the object from the message queue, and optionally remove the messageID from the messageState table.

Various high-performance asynchronous messaging transport such as zeroMQ or nanoMSG may be implemented, depending upon embodiments. On top of the messaging transport the following principles may be used for implementation: CRDTs may be transferred using a serialization protocol (e.g., CBOR, MessagePack, Apache Avro, protobuf, JSON, etc.); payload of CRDTs is transferred in frames following the Type Length Value (TLV) notation; payload for all object types (messagePayload CRDT object update, messageEventState CRDT object update, messageDestinations CRDT object update) is transferred; operations are asynchronous using either REQ-RESP or PUB-SUB pattern and may use various asynchronous message transport; requests contain the source replica object in the first request and operational update objects in subsequent updates; responses (ACKs) comprise operational update objects and are optional; a requester does not have to wait or block for the responses; batching of messages is allowed; and out of order delivery is allowed.

Tightly Coupled Destination and Architecture

Figure 2:
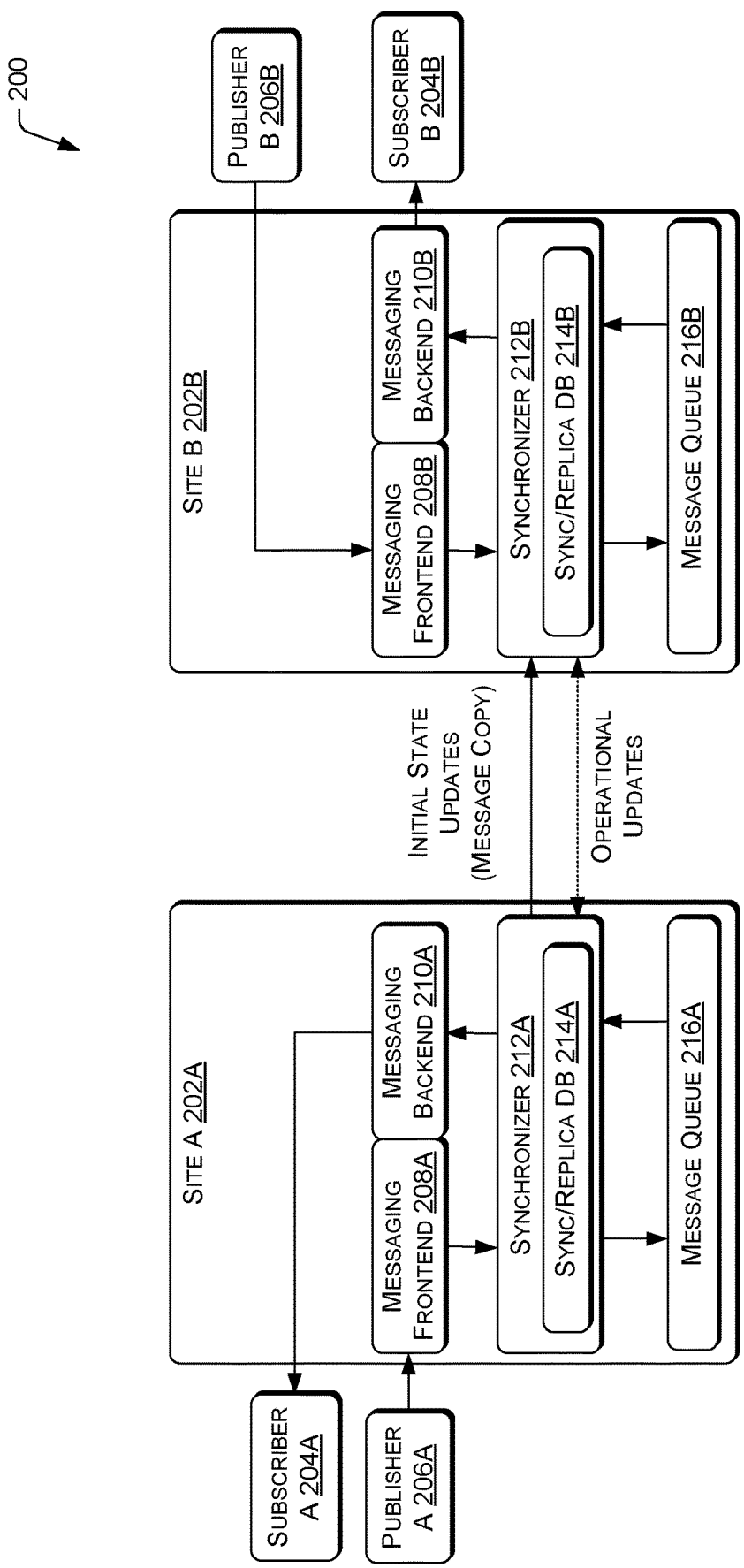
FIG. 2 is a tightly coupled destination and architecture for providing consistent data replication in queue-based messaging systems.

FIG. 2 shows a tightly coupled model 200 of a message queuing system architecture comprising a two-site configuration, wherein site A 202A can comprise a source system and site B 202B can comprise a downstream system. In the tightly coupled model 200, the messaging frontend 208A, 208B is tightly coupled to the messaging backend 210A, 210B so that it is assumed that for each received message from a publisher 206A, 206B published to a particular topic associated with a specific queue, the destination set is immediately known. A thin and lightweight synchronizer layer 212A, 212B is inserted between messaging frontend 208A, 208B and backend 210A, 210B and message queue 216A, 216B.

The synchronizer 212A, 212B processes incoming messages, calculates a globally unique message identifier (messageID), creates CRDTs necessary for the eventually consistent replication, and sends updates to site B 202B, the downstream system. Thus, the synchronization protocol's endpoint is at the synchronizer layer 212A, 212B.

Accordingly, the source synchronizer 212A has the capability to immediately copy the messageDestinations CRDT object to the replica and the destination can be tied to a particular message and sent to site B 202B. If there are no subscribers 204A, the message may be discarded or put into the message queue 216A according to the policy or a particular implementation. The synchronizer 212A, 212B sends and receives updates to CRDTs using a lightweight asynchronous messaging protocol. Because the CRDTs are atomic, they do not depend on each other and updates for those can be sent at any time and in any order. Therefore, a CRDT update is sent as soon as the local (source) operation in synchronizer related to the CRDT is complete. The replica of the messagePayload CRDT object, messageEventState CRDT object, and messageDestinations CRDT object can be batched and sent close together in time to site B 202B, allowing for the most complete and fast synchronization update of the initial state. Synchronization state as indicated by the synchronizer 212A, 212B is reflected and stored in the sync/replica state database 214A, 214B.

Placing a message in the message queue 216A preserves the payload delivery queue sequence. While in the message queue 216A, the subscriber list may change. For example, subscribers 204A, 204B may be added or removed. The message is retained until it is sent to all subscribers 204A, 204B present at message reception, and those added while the message was in the queue 216A. Any subsequent change of the destination set at site A 202A will immediately result in the operation update message sent to site B 202B for a particular message corresponding to a messageID. After a successful delivery, the message remains in the message queue 216A until the subscriber list is synchronized between two sites A and B 202A, 202B post processing or after message left the queue, and no new subscribers have been added. After complete synchronization of the delivery state to all subscribers 216A, 216B, the message is discarded or archived.

Semi-Loosely Coupled Destination and Architecture

Figure 3:
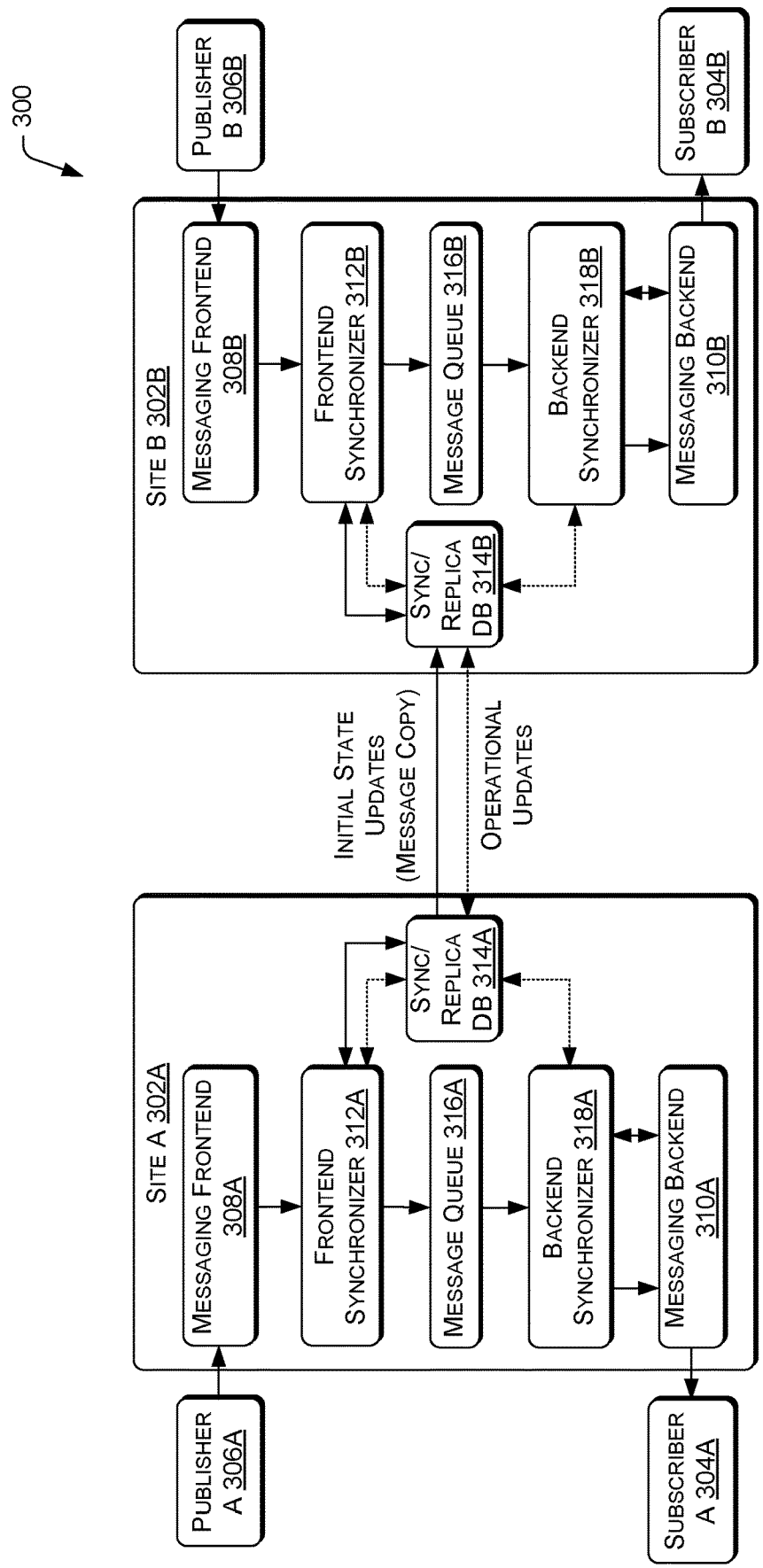
FIG. 3 is a semi-loosely coupled destination and architecture for providing consistent data replication in queue-based messaging systems.

FIG. 3 shows a semi-loosely coupled model 300 of a message queuing system architecture comprising a two-site configuration, wherein site A 302A can comprise a source system and site B 302B can comprise a downstream system. The processing flow is substantially similar to the loosely coupled architecture shown in FIG. 1, but the loosely coupled model and the semi-loosely coupled model differ in the synchronization protocol's endpoint. In the semi-loosely coupled model, it is also assumed that the messaging frontend 308A, 308B, and the messaging backend 310A, 310B are separated by opaque message queue 316A, 316B. Accordingly, the receiving (publication) messaging frontend 308A, 308B, which interacts with publisher A 306A, publisher B 306B, respectively, has no knowledge about the subscription state of the sending (subscription) backend 310A, 310B.

Similar to the loosely coupled definition model, two synchronizer layers 312A, 312B, 318A, 318B are split for the frontend and backend processing. The global state is available to both synchronizers 312A, 312B, 318A, 318B via the sync/replica database 314A, 314B or the messageState table. The processing is decoupled and efficient because each synchronizer 312A, 312B, 318A, 318B only creates and sends updates related to the knowledge at hand without blocking the messagePayload CRDT object processing. The semi-loosely coupled definition model requires a separate independent operation update traffic between the delivery backends. Only upon the delivery backend message processing, can the message state be updated to "delivered," where successful destinations are removed, and unsuccessful destinations remain.

Upon publication reception at source site A 302A, the frontend synchronizer 312A, 312B issues the initial state copy sync message without the messageDestinations CRDT object and sends it to the downstream site B 302B. Additionally, the frontend synchronizer 312A, 312B creates CRDTs and a messageID (hash) corresponding to the message is generated. The messagePayload CRDT is placed in the message queue 316A. The destination knowledge for a particular topic resides with the delivery backend 310A, 310B and the message only learns about all possible destinations upon its processing by the delivery backend 310A, 310B.

While messagePayload CRDT is in the message queue 316A, 316B, the backend synchronizer 318A, 318B reads the message topic from the messageState table and resolves current active destinations mapped to the message topic. Thus, even if a subscriber list for the particular message topic changes while the message is in the message queue 316A, 316B, the messageDestinations CRDT object captures all existing and new subscriptions during the lifecycle of the message and the messageDestinations CRDT object is synchronized asynchronously and are resolved upon message processing when it reaches the head of the message queue 316A, 316B. The backend synchronizer 318A, 318B then sends messageDestination updates asynchronously to site B 302B.

Updates to the messageDestinations CRDT object implements a modified OR-Set, which is a 2P-Set, namely both additions and removals of the elements are allowed, subject to the rule that the latest addition wins, both additions and removals are recorded, and only unique elements (not previously observed) can be added, allowing for fully determined conflict resolution. Modification of the OR-Set is in the addition of the constraint that once a particular element has been removed, it may not be added again. Accordingly, only previously unobserved elements can be added to the destination. This allows for implementation of a "Delivered Exactly Once" semantics, which relates to MQTT QoS 2. Namely, for the lifecycle of the replicated message, the addition of the new subscribers is allowed, whereas the addition of previously removed subscribers is not allowed. As soon as the subscriber set becomes empty or the message has been delivered to all subscribers observed during the lifecycle of the message, it is discarded.

When messagePayload CRDT is read from the message queue 316A, 316B, the backend synchronizer 318A, 318B receives a superset of subscribers 304A, 304B from the messageDestinations CRDT object, and the list of currently active subscribers resolved to the message topic at source site A 302A.

When the message is partially delivered, backend synchronizer 318A, 318B updates local CRDT objects, sends updates downstream to site B 302B, updates state in the messageState table, and records the messagePayload CRDT address in the message queue 316A, 316B. After a successful delivery, the message remains in the message queue 316A, 316B until the subscriber list is synchronized post processing or after message left the message queue 316A, 316B, and no new subscribers have been added on the other side. If any of previously known subscribers 304A, 304B re-appear by re-subscribing at site A 302A, the backend synchronizer 318A, 318B then re-reads message from the message queue 316A, 316B and delivers to renewed subscribers 304A, 304B. As soon as the message has been delivered to all subscribers 304A, 304B, the backend synchronizer 318A, 318B, after updating the state and ensuring all consistency conditions are met, can remove the message from the message queue 316A, 316B or archive it.

The update consists of only incrementing the state. Increments can jump states. For example, changing from state 1 (received) to state 3 (partially delivered) is possible. Site B 102B, in this case, needs to perform all operations between the states. For instance, changing from state 1 (received) to state 3 (partially delivered) will result in placing the message into a queue (action for state 2—stored), and updating the messageDestinations CRDT object (action for state 3, partially delivered).

In contrast to the loosely coupled model, updates are sent to site B 302B by an intermediate component instead of a frontend synchronizer 308A, 308B. Transmitting a message replica object is prioritized and therefore performed before putting the message into message queue 316A, 316B. Destination or subscribers 304A, 304 B may be added to the message state at a later phase, after which the separate operation update is sent out. In various embodiments, each update may receive an acknowledgment from site B 302B. The frontend synchronizer 312A can update a sync/replica state database 314A, which may act as the intermediate component. Accordingly, the synchronization protocol's endpoint is at the sync/replica database 314A, 314B or the intermediate component. The sync/replica database 314A, 314B can implement the messageState table, which can indicate whether a particular messageID corresponding to a message is in active processing in the system and keep the general state of the message as well as globally synchronized vector time.

For example, the messageState table can indicate whether the message with the messageID has not been observed by the local system; the message with messageID has been observed, but the payload has not yet been received (out of order delivery) or the lifecycle has been finished, the message has been fully processed and removed from the system; the message with messageID has been observed and the payload has been received; the message with messageID and payload has been received without previous out of order delivery; or the message has been removed from the active state.

The messageState table can also indicate whether or not the message is in the local message queue. The system actions are defined on the change in the state after an update. When the message is put into the queuing system, the messageState table record is updated to reflect the updated topic information in the pointer to local queue field and that the message is moved to the added set (Set A). When the message is completely processed, the messageState table is updated to reflect that the message is now moved to the removed set (Set R).

These two sets (Set A and Set R) implement a CRDT with the 2P-Set semantics that the unique (new) messageID only can be added once to the set A. Once added, the messageID then only can be removed after all processing has been done. After removal, the messageID is moved to the set R. Therefore, this avoids adding duplicate or already processed messages to the synchronizer sets. The 2P-Set is extended with the unique element check to ensure that not only an element may be added only once as in the 2P-Set, but also that the messageID may not be added again if it previously has been removed.

Example Computing Device Components

Figure 4:
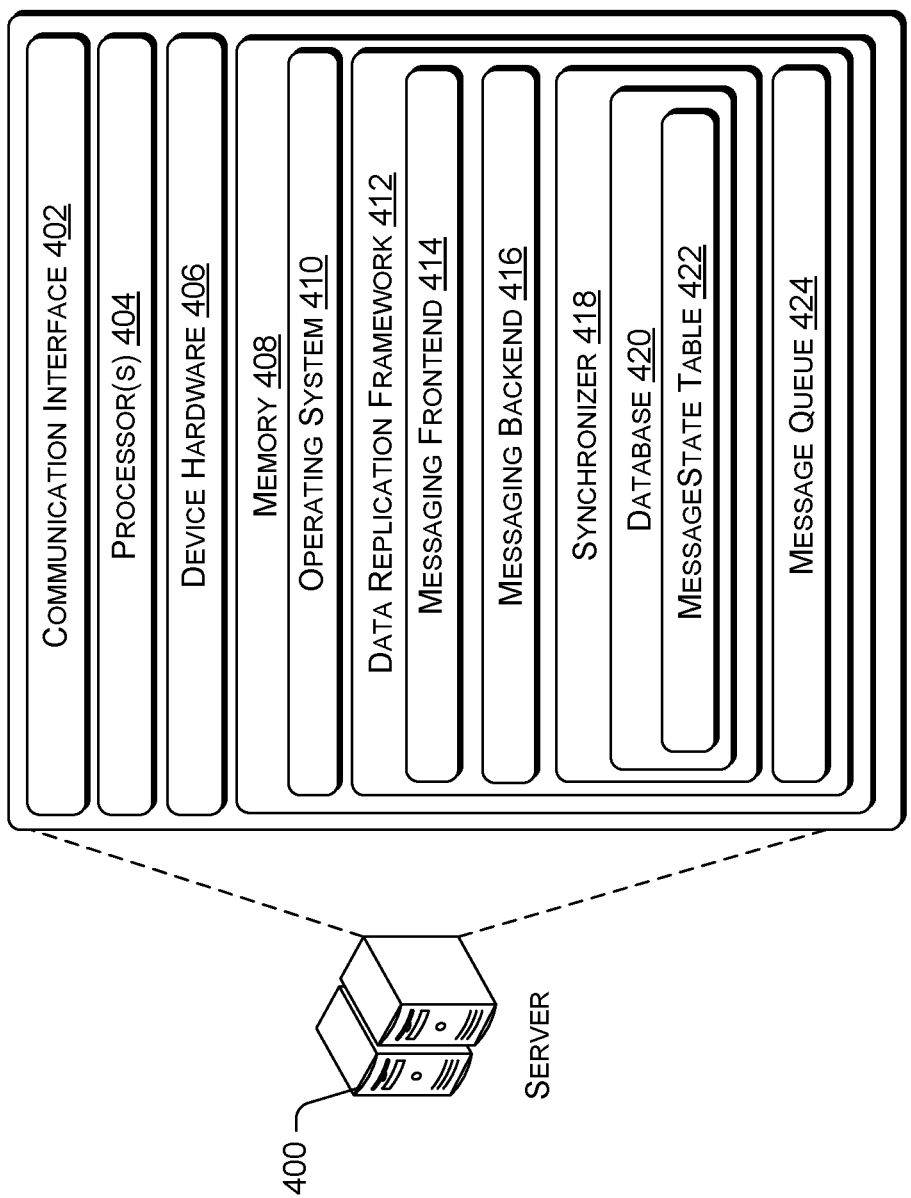
FIG. 4 is a block diagram showing various components of an illustrative computing device that is configured to provide consistent data replication in queue-based messaging systems.

The embodiments described herein may be implemented in software that runs on one or more computing devices. FIG. 4 is a block diagram showing various components of an illustrative computing device 400. It is noted that the computing device 400 as described herein can operate with more or fewer of the components shown herein. Additionally, the computing device 400 as shown herein or portions thereof can serve as a representation of one or more of the computing devices of the present system.

The computing device 400 may include a communication interface 400, one or more processors 404, hardware 406, and memory 408. The communication interface 402 may include wireless and/or wired communication components that enable the computing device 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or non-volatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, code segments, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, code segments, program modules, or other data in a modulated data signal, such as a carrier wave, or other transmission mechanisms. The memory 408 may also include a firewall. In some embodiments, the firewall may be implemented as hardware 406 in the computing device 400.

The processors 404 and the memory 408 of the computing device 400 may implement an operating system 410 and a data replication framework 412. The operating system 410 may include components that enable the computing device 400 to receive and transmit data via various interfaces (e.g., user controls, a communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system. The computing device 400 can communicate with a plurality of databases.

The data replication framework 412 includes a messaging frontend 414, a messaging backend 416, a synchronizer 418 comprising a database 420 (e.g., the sync/replica database), and a message queue 424, wherein the database 420 can comprise a messageState table 422. In a tightly coupled destination model, the messaging frontend 414 and the messaging backend 416 may be tightly coupled so that it is assumed that for each received message published to a particular topic associated with a specific queue, the destination set is immediately known.

Alternatively, the messaging frontend 414 and the messaging backend 110 can be separated by the synchronizer 418 and the message queue 424. The synchronizer 418 itself can be split into a frontend synchronizer and a backend synchronizer, wherein the message queue and/or an intermediate component such as the database 420 can be inserted between the frontend synchronizer and the backend synchronizer. In a loosely coupled destination model, the frontend synchronizer can implement an update protocol independent endpoint. In a semi-loosely coupled destination model, the intermediate component can implement the update protocol independent endpoint.

In the tightly coupled destination model, the synchronizer processes incoming messages, calculates a globally unique message identifier (messageID), creates CRDTs necessary for the eventually consistent replication, and sends updates to a downstream site. In the loosely coupled destination model or semi-loosely coupled destination model, the frontend synchronizer issues the initial state copy sync message without the messageDestinations CRDT object and sends it to a downstream site.

The messaging frontend 414 can place received messages in the message queue 424 associated with the topic if the destinations (subscribers) are not known. The destination knowledge for a particular topic resides with the delivery backend 416 in the loosely coupled destination model or semi-loosely coupled destination model and the message only learns about all possible destinations upon its processing by the delivery backend 416. The synchronizer 418 can update the message state in the messageState table 422.

While the message is in the message queue 424, the backend synchronizer in the loosely coupled destination model or semi-loosely coupled destination model reads the message topic from the messageState table 422 and resolves current active destinations or subscribers mapped to the message topic. When the message reaches the messaging backend 416, it is delivered to all available subscribers. If, while the message has been in the queue 424, the list of subscriber changes, then the synchronizer only delivers to the currently available subscribers, and the message remains in the message queue 424. As soon as the message has been delivered to all subscribers and the message states have been synchronized between the source site and the downstream site, the synchronizer can remove the message from the message queue 424 and the message processing is complete for the particular messageID.

Example Processes

FIGS. 5 through 7B present illustrative processes 500-700 for ensuring reliable delivery of massive amounts of messages using asynchronous replication and updates of CRDTs. The processes 500-700 are illustrated as a sequence of operations that can be implemented in hardware, software, or a combination thereof. In the context of software, the steps represent computer-executable instructions that, when executed by one or more processors, perform the recited operations. Generally, computer-executable instructions may include routines, programs, objects, components, data structures, code segments, and the like that perform particular functions or implement particular abstract data types. The order in which the operations are described is not intended to be construed as a limitation, and any number of the described steps can be combined in any order and/or in parallel to implement the process. For discussion purposes, the processes 500-700 are described with reference to the architectures 100-300 of FIGS. 1-3.

Figure 5:
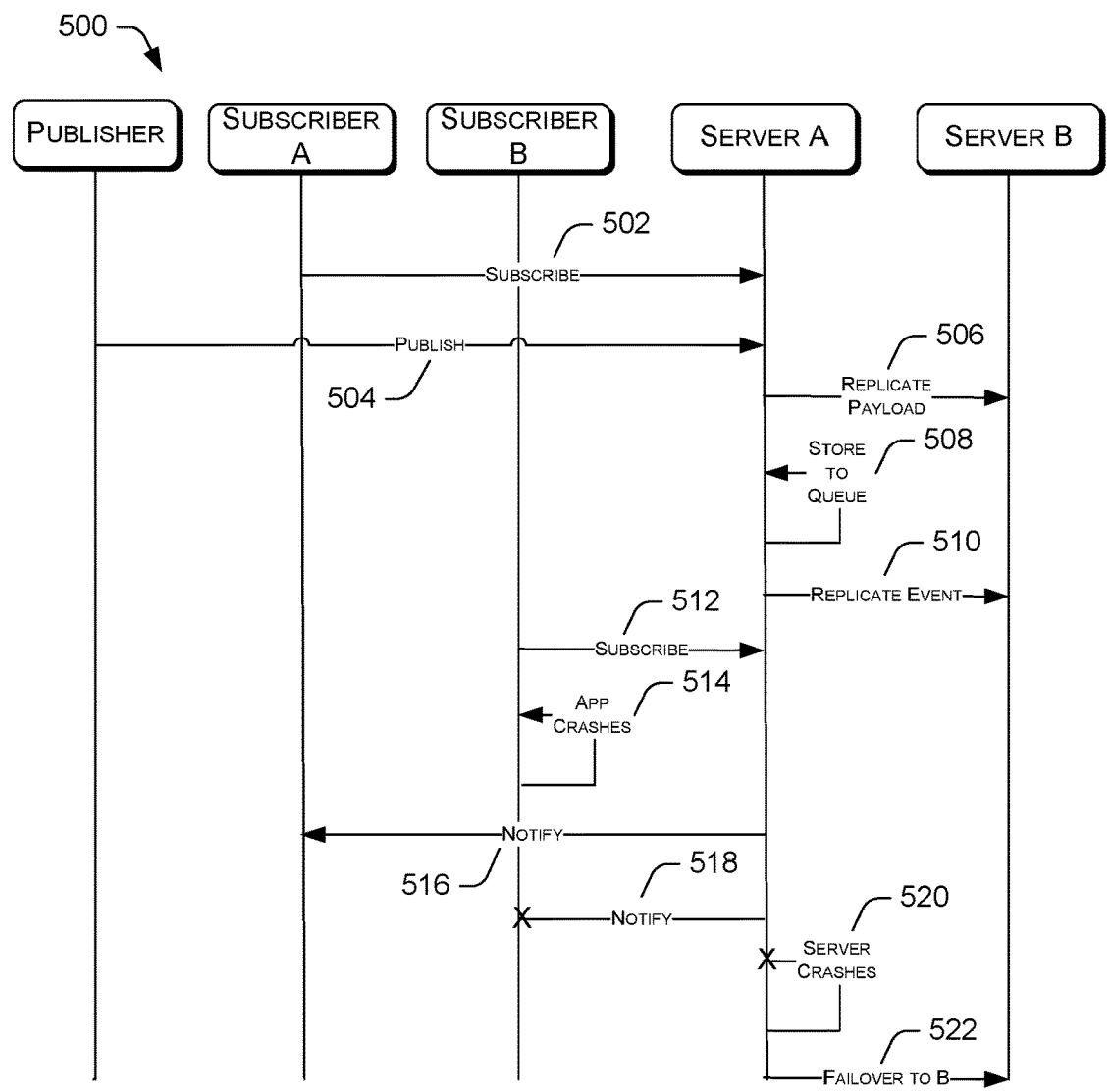
FIG. 5 is a flow diagram of an example sequence of messages and high-level states of the scenario where MQTT messages are transmitted using MQTT protocol.

FIG. 5 is a flow diagram of an example sequence of messages and high-level states of the scenario where MQTT messages are transmitted using MQTT protocol. In the illustrated embodiments, the system comprises a two-site configuration wherein site A can comprise a source system server A and site B can comprise a downstream system including server B. The only precondition is that each process needs to know the total number of processes. In an active-passive system configuration where server A is in an active state and server B is in a passive state, subscriber A subscribes to the topic related to a publisher at step 502. At step 504, a message from the publisher is received at a server A. At step 506, the message payload is replicated to server B, which places is in the replica buffer. At step 508, the message payload is stored to a message queue at server A. Message state is changed to "stored" and replicated to server B at step 510. Subscriber B subscribes to the same topic, is added to the messageState table and replicated to server B at steps 512. At step 514, if subscriber B disconnects (or crashes) before the message is delivered to subscriber B, the message is delivered to subscriber A at step 516, but not subscriber B at step 518, changing state to partially delivered. Server A can unsuccessfully attempt message delivery to subscriber B and subsequently crash at step 520. At the end of the sequence, the states at two servers are mostly synchronized, but with different values of vector clocks because the final acknowledgment from server B to server A fails at step 522. Vector clock can indicate that the state at server B is more recent due to the last successful update.

Figure 6:
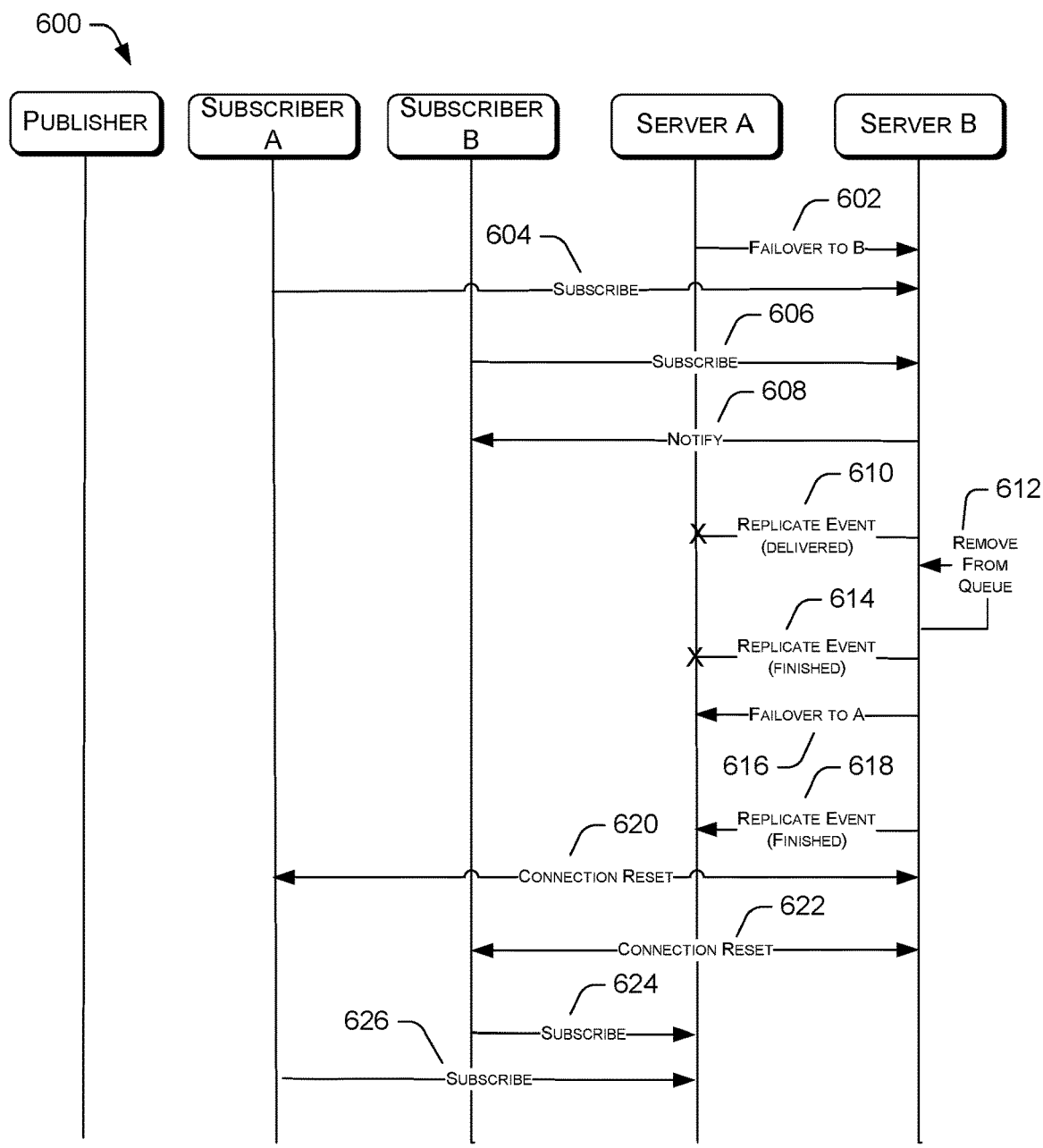
FIG. 6 is a flow diagram of another example process in which after failover to an additional server, and after an original server recovers, the failover is performed back to the original server.

FIG. 6 is a flow diagram of another example process 600 after failover to server B, and after server A recovers, the failover is performed back to server A. After failover to server B, which is now active, and server A is crashed and is down at step 602. At step 604, subscriber A re-subscribes to the topic on the now active server B. At step 606, subscriber B recovers and also re-subscribes to the topic on the now active server B. Since subscriber A has been removed from the messageDestinations CRDT object, the message is not delivered to subscriber A. The "Delivered Exactly Once" semantics hold and the message is successfully delivered to subscriber B at step 608. Local state on server B is updated to "delivered." The message is removed from the message queue at step 612. Additionally, or alternatively, the message may have stayed in the queue until server A recovers and synchronizes with server B. At steps 610, 614, and 618, updates are not reaching server A, resulting in state divergence between server A and server B.

At step 616, as soon as server A recovers, the correct failover procedure is to synchronize all updates first. At step 618, a repeated update is successful. In response to a successful update, destination subscriber B is removed from server A as the message has already been delivered from server B. After successful updates, vector clocks converge indicating fully synchronized state between the two servers A and B. Server A becomes available for connections at steps 620 and 622. Both subscriber A and subscriber B re-subscribe at steps 624 and 626, but no messages are delivered as the messageState table and queue are empty.

In an active-passive system configuration where server A is in a failed state and server B is in a currently active state, there is the possibility for message duplication if, after the system failover, the delivery event happens before the synchronization event. To ensure the semantics of QoS 2 by mitigating message duplication, the following failover procedure mandates the synchronization be performed before opening up access to the recovering site. First, the failed site is recovered and then synchronization is performed between the recovering site and the currently active site. Thereafter, access is switched over to the currently active site.

Figure 7A:
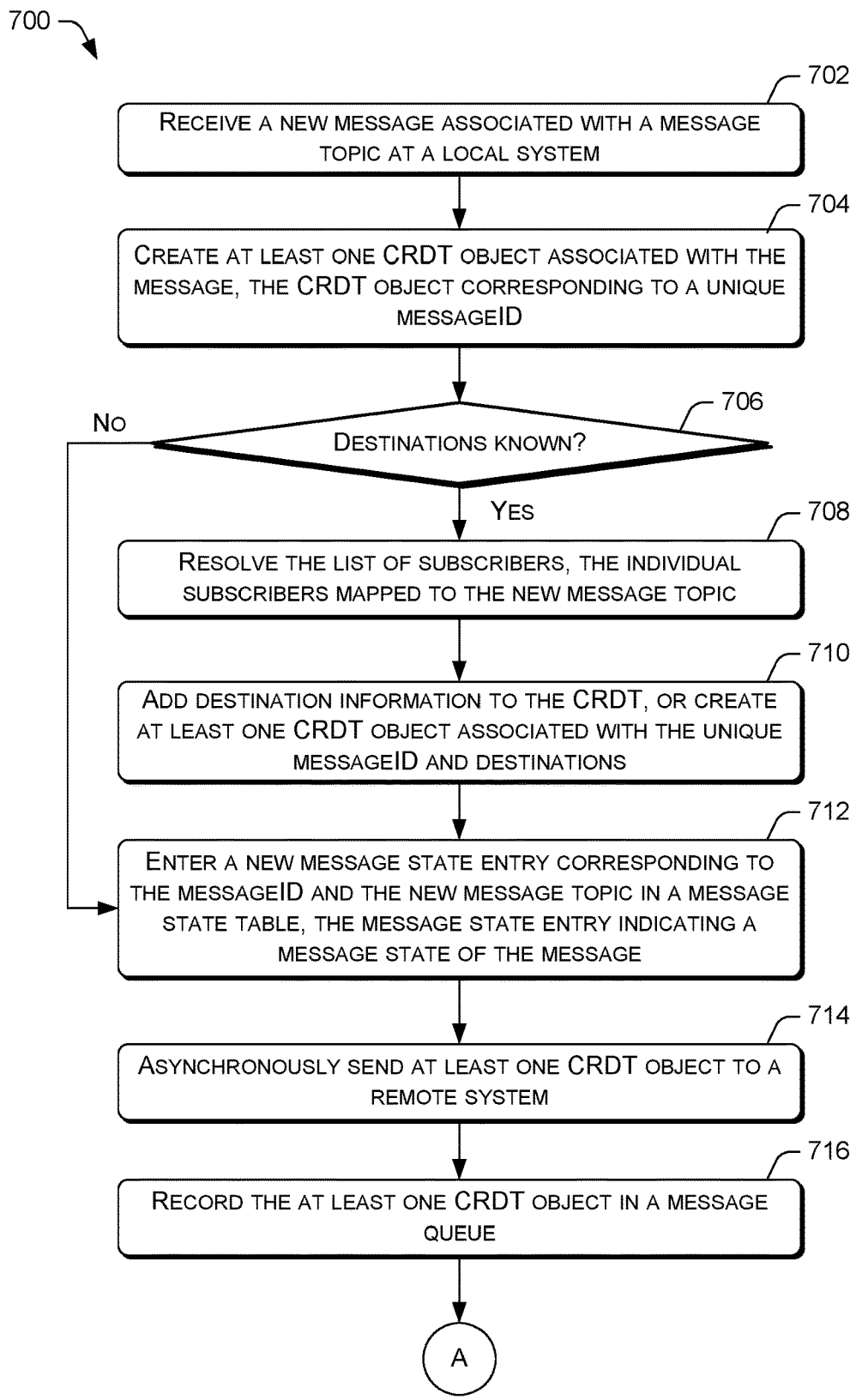
FIGS. 7A and 7B are flow diagrams of an example process for performing data replication in queue-based messaging systems.
Figure 7B:
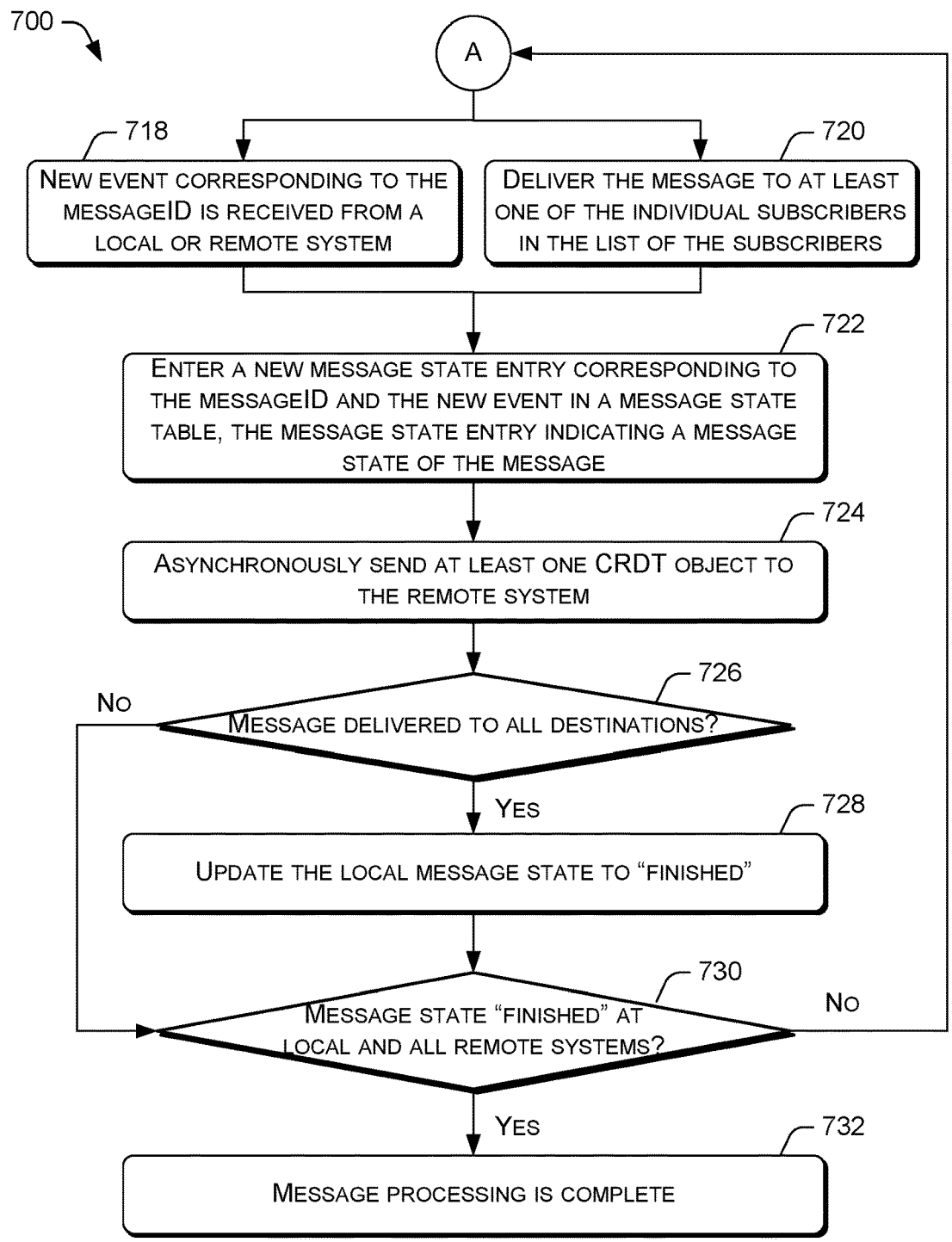

FIGS. 7A and 7B are flow diagrams of an example process for performing data replication in queue-based messaging systems. At block 702, a messaging frontend receives a new incoming message associated with a message topic at a local system. At block 704, a synchronizer creates at least one CRDT object comprising a messagePayload CRDT object associated with the message, the messagePayload CRDT object corresponding to a unique messageID. The messagePayload CRDT object comprises the message body in its entirety. In a loosely coupled or semi-loosely coupled destination model, the frontend synchronizer can create the CRDT objects. The CRDT objects include a messagePayload CRDT object, a messageEventState CRDT object, and a messageDestinations CRDT object.

At decision block 706, if destinations are known ("yes" response), the synchronizer resolves the list of subscribers, the individual subscribers mapped to the message topic, as indicated in block 708. In a loosely coupled or semi-loosely coupled destination model, the backend synchronizer can resolve the list of subscribers. At block 710, the synchronizer creates the messageDestinations CRDT object and appends to the CRDT to the message. The synchronizer resolves the list of subscribers based at least on the messageDestinations CRDT object. Additionally, the synchronizer records both the messagePayload CRDT object and the messageDestinations CRDT object (appended) in a message queue at the local system.

If the destinations are not known ("no" response from the decision block 706), the synchronizer enters a new message state entry corresponding to the messageID and the message topic in a messageState table at the local system, the message state entry indicating a message state of the message, as indicated in block 712. At block 714, the synchronizer sends at least one CRDT object for state synchronization to a remote system. Operations at blocks 712 and 714 may be executed in parallel or in any sequence. At block 716, the synchronizer records the messagePayload CRDT object in a message queue at the local system.

The synchronizer can enter an event loop for the lifecycle of the message, i.e., until the message states at all systems (local and all remote) have reached the "finished" state. During the lifecycle of the event loop, if any new event happens either in the local system or a remote system, a synchronization update in the form of at least one CRDT is received, as indicated at block 718. Thereafter, the CRDT describing the event is created and sent to the remote system, or an acknowledgement for the received CRDT describing the event in the remote system is sent to the local system. Additionally, a new message state entry is entered in the messageState table.

In parallel, at block 720, the messaging backend delivers the message to at least one of the subscribers in the list of the subscribers, which constitutes one of the local events in the evolution of the message delivery. If the message is delivered to some of the subscribers, the message state is "partially delivered." If the message is delivered to all of the subscribers, the message state is "delivered." At block 722, the synchronizer enters a new message state entry corresponding to the messageID and the new event in a messageState table, the message state entry indicating a message state of the message. At block 724, the synchronizer sends at least one CRDT object for state synchronization to a remote system.

At decision block 726, if message has been delivered to all destinations at local system, the local message state is changed to "finished," as indicated in block 728. At decision block 730, if the local system has received related event CRDTs from all remoted systems indicating the remote message states as "finished", the message processing is considered as complete, and the event loop is exited, as indicated in block 732.

Eventually consistent asynchronous and performant system has been introduced to ensure reliable delivery of massive amounts of messages via geographically redundant distributed message queuing system using asynchronous replication and updates of specific CRDTs preserving the semantics of common IoT messaging protocols. The solution allows to guarantee the delivery semantics of "At Least Once" and "Exactly Once" in a distributed geo-redundant IoT messaging queue-based system, therefore solving the problem of geo-redundant message queue replication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. One or more non-transitory computer-readable media storing computer-executable instructions that upon execution cause one or more processors to perform acts comprising: receiving a message at a local system, the message associated with a new message topic; creating at least one commutative replicated data type (CRDT) object associated with the message, the at least one CRDT object corresponding to a unique message identifier (ID); entering a new message state entry corresponding to the unique message ID and the new message topic in a message state table, the new message state entry indicating a message state corresponding to the message; recording the at least one CRDT object in a message queue; resolving a list of subscribers that includes individual subscribers mapped to the new message topic; and delivering the message to at least one of the individual subscribers in the list of subscribers; wherein the at least one CRDT object comprise a message payload CRDT object, a message event state CRDT object, and a message destinations CRDT object, the message payload CRDT object comprising a message payload and message metadata corresponding to the unique message ID, the message event state CRDT object comprising a message state evolution mapped to particular events related to state changes and message processing, and the message destinations CRDT object comprising the list of subscribers, and wherein the individual subscribers corresponding to a client identifier and subscription topic filters associated with the client identifier.

2. The one or more non-transitory computer-readable media of claim 1, further comprising: updating the at least one CRDT object at the local system; transmitting at least one of an updated message event state CRDT object and an updated message destination CRDT object to a downstream system, wherein the downstream system is a geographically redundant distributed message queueing system; and entering an updated message state entry corresponding to the unique message ID and the new message topic in the message state table.

3. The one or more non-transitory computer-readable media of claim 2, further comprising:
receiving an acknowledgment from the downstream system, the acknowledgment associated with the message state corresponding to the message.

4. The one or more non-transitory computer-readable media of claim 1, further comprising:
determining whether any subscribers re-subscribed to the list of subscribers; and
delivering the message to a list of renewed subscribers comprising the re-subscribed subscribers.

5. The one or more non-transitory computer-readable media of claim 1, further comprising:
maintaining the message in the message queue until the list of subscribers is synchronized between the local system and a downstream system.

6. The one or more non-transitory computer-readable media of claim 1, wherein the message is delivered based at least on a Quality of Service (QoS) identifier corresponding to the message.

7. The one or more non-transitory computer-readable media of claim 1, wherein the message state table comprises a database, hash table, hash tree, struct type, class or object.

8. The one or more non-transitory computer-readable media of claim 1, wherein the message state comprises at least one of received, stored, partially delivered, delivered, and finished.

9. A computer-implemented method, comprising: receiving a message at a local system, the message associated with a new message topic; creating at least one commutative replicated data type (CRDT) object associated with the message, the at least one CRDT object corresponding to a unique message identifier (ID); entering a new message state entry corresponding to the unique message ID and the new message topic in a message state table, the new message state entry indicating a message state corresponding to the message; recording the at least one CRDT object in a message queue; resolving a list of subscribers that includes individual subscribers mapped to the new message topic; and delivering the message to at least one of the individual subscribers in the list of subscribers; wherein the at least one CRDT object comprise a message payload CRDT object, a message event state CRDT object, and a message destinations CRDT object, the message payload CRDT object comprising a message payload and message metadata corresponding to the unique message ID, the message event state CRDT object comprising a message state evolution mapped to particular events related to state changes and message processing, and the message destinations CRDT object comprising the list of subscribers, the individual subscribers corresponding to a client identifier and subscription topic filters associated with the client identifier.

10. The computer-implemented method of claim 9, further comprising: updating the at least one CRDT object at the local system; transmitting at least one of an updated message event state CRDT object and an updated message destination CRDT object to a downstream system, wherein the downstream system is a geographically redundant distributed message queueing system; and entering an updated message state entry corresponding to the unique message ID and the new message topic in the message state table.

11. The computer-implemented method of claim 10, further comprising:
receiving an acknowledgment from the downstream system, the acknowledgment associated with the message state corresponding to the message.

12. The computer-implemented method of claim 9, further comprising:
determining whether any subscribers re-subscribed to the list of subscribers; and
delivering the message to a list of renewed subscribers comprising the re-subscribed subscribers.

13. The computer-implemented method of claim 9, further comprising:
maintaining the message in the message queue until the list of subscribers is synchronized between the local system and a downstream system.

14. The computer-implemented method of claim 9, wherein the message is delivered based at least on a Quality of Service (QoS) identifier corresponding to the message.

15. A system, comprising: one or more non-transitory storage mediums configured to provide stored code segments, the one or more non-transitory storage mediums coupled to one or more processors, each configured to execute the code segments and causing the one or more processors to: receive a message at a local system, the message associated with a new message topic; create at least one commutative replicated data type (CRDT) object associated with the message, the at least one CRDT object corresponding to a unique message identifier (ID); enter a new message state entry corresponding to the unique message ID and the new message topic in a message state table, the new message state entry indicating a message state corresponding to the message; record the at least one CRDT object in a message queue; resolve a list of subscribers that includes individual subscribers mapped to the new message topic; and deliver the message to at least one of the individual subscribers in the list of subscribers; wherein the at least one CRDT object comprise a message payload CRDT object, a message event state CRDT object, and a message destinations CRDT object, the message payload CRDT object comprising a message payload and message metadata corresponding to the unique message ID, the message event state CRDT object comprising a message state evolution mapped to particular events related to state changes and message processing, and the message destinations CRDT object comprising the list of subscribers, and wherein the individual subscribers corresponding to a client identifier and subscription topic filters associated with the client identifier.

16. The system of claim 15, wherein the one or more processors are further configured to:
update the at least one CRDT object at the local system, wherein the at least one CRDT object comprises a message event state CRDT object, and a message destinations CRDT object;
transmit at least one of an updated message event state CRDT object and an updated message destination CRDT object to a downstream system, wherein the downstream system is a geographically redundant distributed message queueing system; and
enter an updated message state entry corresponding to the unique message ID and the new message topic in the message state table.

17. The system of claim 16, wherein the list of subscribers comprises a first subscriber and a second subscriber, the message is delivered to the first subscriber and not delivered to the second subscriber, wherein the one or more processors are further configured to:
remove the first subscriber from the message destinations CRDT object when the local system is passive;

add the second subscriber added to the message destinations CRDT object by re-subscribing to the new message topic when the downstream system is active; and
update the message state corresponding to the message in the message state table when the second subscriber receives the message.

18. The system of claim 17, wherein the one or more processors are further configured to:
synchronize the message state between the local system and the downstream system when the local system and the downstream system are active.

* * * * *